UNITED STATES PATENT OFFICE.

CHARLES N. TINKLEPAUGH, OF BURTON, OHIO.

DESICCATED-FRUIT PRODUCT.

1,033,637. Specification of Letters Patent. Patented July 23, 1912.

No Drawing. Application filed May 23, 1911. Serial No. 628,967.

*To all whom it may concern:*

Be it known that I, CHARLES N. TINKLEPAUGH, a citizen of the United States, residing at Burton, in the county of Geauga and State of Ohio, have invented new and useful Improvements in Desiccated-Fruit Products, of which the following is a specification.

This invention relates to a novel desiccated fruit product, and particularly to a novel mode of preparing lemons for preservation, whereby the fruit may be indefinitely kept, while retaining all the original properties of the fresh fruit.

In carrying my invention into practice, the fresh ripe or nearly ripe fruit to be preserved is first sliced or cut into small pieces with the skin and pulp intact, then sprinkled or coated with dry granulated sugar, and then immediately dried in the sun or dried or evaporated in any of the well known ways. As a result of this process of treatment, the greater part of the water is evaporated from the fruit, while the essences or volatile constituents are partly taken up or absorbed by the saccharine coating and partly confined in the pulp and skin by such coating. The fruit thus prepared has the general appearance of ordinary conserved fruit and may be employed for flavoring and any of the ordinary purposes for which the fresh fruit is used.

Having thus described my invention, what I claim as new is:

As a new article of manufacture, the herein described desiccated fruit product, comprising divided uncooked portions of lemons with pulp and skin intact, and having a saccharine coating confining and holding against evaporation the volatile constituents of the fruit.

In testimony whereof I affix my signature in presence of two witnesses.

CHARLES N. TINKLEPAUGH.

Witnesses:
C. E. WILLIAMS,
J. E. WALES.